April 7, 1959 L. H. BOYER 2,881,231
PEBBLE HEATER APPARATUS AND PROCESS
Filed May 5, 1952
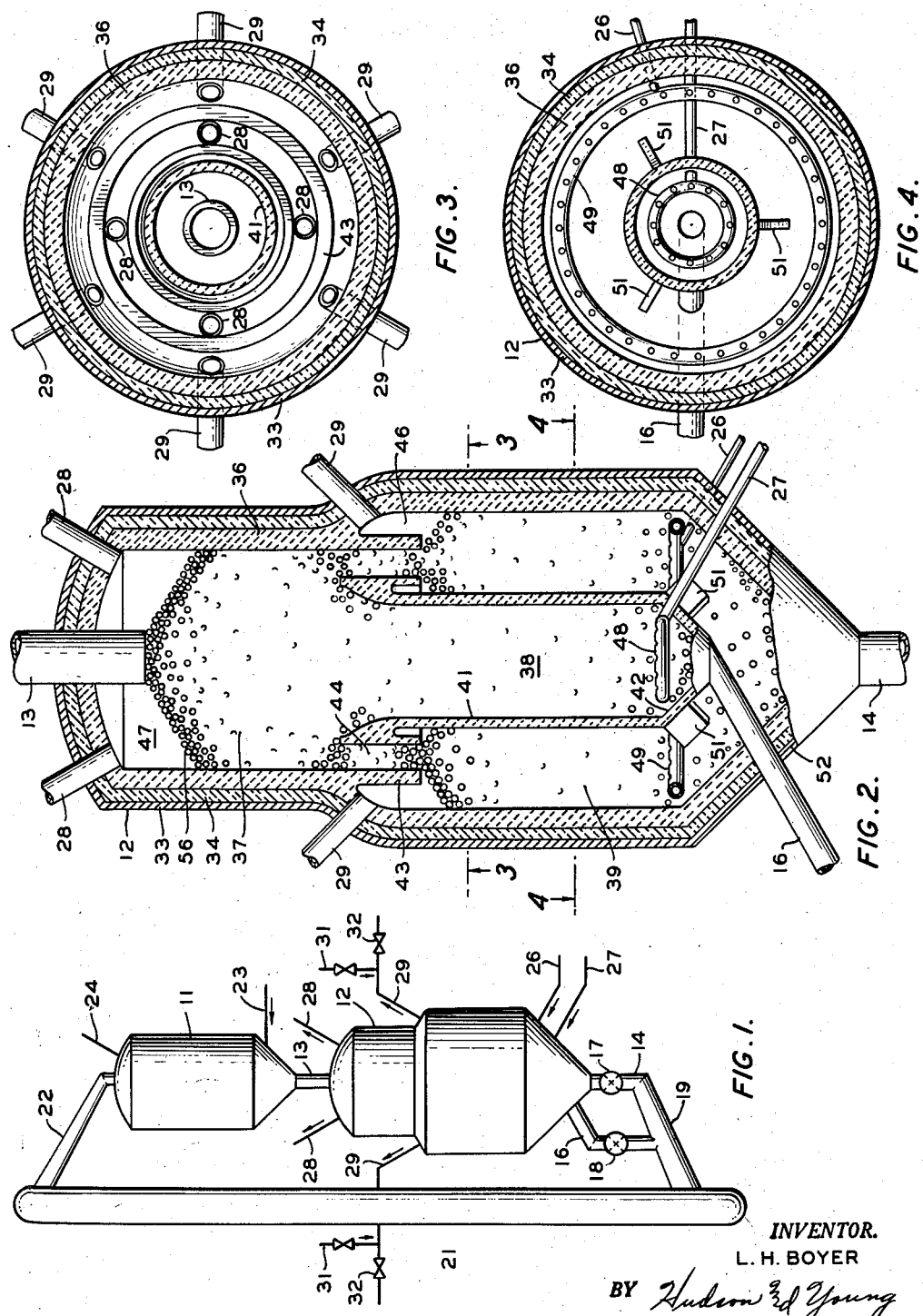
INVENTOR.
L. H. BOYER
BY *Hudson 3d Young*
ATTORNEYS

United States Patent Office 2,881,231
Patented Apr. 7, 1959

2,881,231

PEBBLE HEATER APPARATUS AND PROCESS

Lee H. Boyer, Idaho Falls, Idaho, assignor to Phillips Petroleum Company, a corporation of Delaware Application May 5, 1952, Serial No. 286,190

20 Claims. (Cl. 260—679)

The invention described herein pertains to an improved pebble heater process and apparatus for effecting high temperature reactions of organic compounds. A specific aspect of the invention relates to the cracking of normally gaseous hydrocarbons to ethylene and acetylene and to apparatus for effecting such a process.

Pebble heat-exchange apparatus has been applied to a wide variety of processes where rapid heating and reaction of gases at high temperature is desirable. In this type of operation a continuous compact mass of highly refractory pebbles descend by gravity through a series of heat-exchange chambers, absorbing the heat from a hot gas, usually combustion gas, in an upper chamber and delivering the heat required for heating and reacting the gases in a lower chamber by direct contact with the feed gas therein.

The pebbles utilized in the process and apparatus may be any of the conventional pebbles of the art. The term "pebble" as used throughout this specification denotes any solid refractory contact material, either catalytic or noncatalytic with respect to the process in which it is used, of flowable form and size, and sufficiently rugged and abrasive resistant for use in cyclic heat-exchange processes. Pebbles are preferably substantially spherical and relatively uniform in size in a given process, but may be of other shapes, either regular or irregular and nonuniform in size. Spheres of about ⅛ inch to 1 inch in diameter function desirably in pebble heat-exchange processes and those in the range of ¼ inch to ⅝ inch are most practical. Since pebble heat-exchange apparatus has its greatest utility in processes requiring gas heating and/or reaction temperatures upwards of about 1500° F., pebbles must be formed of material that will withstand extremely high temperatures. In some hydrocarbon cracking processes, pebbles must withstand temperatures of 3000° F. or even higher. Serviceable heat and abrasive resistant pebbles have been compacted from alumina, mullite, alumina-mullite, zirconia, magnesia, beryllia, thoria, periclase, natural and synthetic clays, and mixtures of these materials. Spheres formed of high temperature alloys and metals have also been found practical in some processes.

The production of certain hydrocarbon compounds such as acetylene from normally gaseous hydrocarbon, including ethane, ethylene, propane, propylene, butane, butylenes, etc., requires extremely rapid heating with very short reaction times and rapid quenching of the reaction products in order to avoid side reactions and over-cracking, which appreciably decreases the yield of acetylene. When cracking normally gaseous hydrocarbons to acetylene in conventional pebble heater apparatus, it has been found particularly difficult to operate with exit pebble temperatures from the reaction chamber sufficiently low to permit transfer of the pebbles in ordinary elevator equipment without cooling the pebbles with air or other gas prior to elevating them to the pebble heating chamber for reheating. In the conversion of propane to acetylene in a conventional pebble heater, the exit pebble temperatures attained when utilizing short reaction times essential to good yields of acetylene are in the range of 1700 to 1900° F. In operations where the pebbles are transferred from the bottom of the reactor to the pebble heating chamber at normal exit temperatures utilizing high temperature alloy elevator equipment, the heat loss in the transfer equipment is sufficiently high to materially reduce the efficiency of the process. In operating with a third heat-exchange chamber positioned below the reactor in which the pebbles are further cooled by contact with air or other gases, there is also considerable loss of heat to the process even though the air might be utilized in the pebble heating furnace as combustion air because the preheated air is greater in quantity than that required for the process and, in addition, the extra equipment adds materially to the cost of the apparatus.

The principal object of the invention is to provide an improved process and pebble heater apparatus for the economical and efficient production of acetylene and ethylene from hydrocarbon feed stocks. It is also an object of the invention to provide a high temperature pebble heater process for cracking normally gaseous hydrocarbons which reduces the temperature of the pebbles to a suitable temperature for transferring them to the upper chamber of the apparatus in ordinary cast iron and steel elevator equipment. Another object of the invention is to provide improved pebble heater apparatus which permits the simultaneous and independent conversion of two separate feed stocks and recovery of the separate product streams. A further object of the invention is to decrease the amount of waste heat in the stack gas from the pebble heater heating chamber. Other objects will become apparent from a consideration of the accompanying disclosure.

The invention utilizes a pebble heater reactor having three separate and distinct reaction zones or chambers including an upper reaction chamber through which all of the pebbles circulate through the apparatus and pass to subjacent reaction chambers each of which opens directly into the lower section of the upper reaction chamber. One of these subjacent reaction chambers is an axially disposed reaction chamber, preferably cylindrical in form, while the other surrounds this axially positioned reaction chamber and usually is of as large or larger diameter than the upper reaction chamber. The preferred arrangement for the subjacent reaction chambers is an axially positioned cylindrical chamber surrounded by an annular chamber, the bottom section of which is conical and spaced apart from the bottom section of the cylindrical chamber so as to permit pebble flow out an axially disposed pebble outlet directly below the cylindrical reaction chamber. The bottom section of the inner reaction chamber is also preferably conical with a pebble outlet at its apex from which a pebble take-off conduit extends downwardly and obliquely through the outer wall of the reactor.

In order to provide a more complete understanding of the invention, reference may be had to the drawing, of which Figure 1 is a diagrammatic elevational view of a preferred modification of the apparatus of the invention. Figure 2 is a vertical partial cross sectional view of the pebble heater reactor of Figure 1. Figure 3 is a horizontal cross sectional view of the reactor of Figure 2 taken on the line 3—3 and Figure 4 is a horizontal cross sectional view of the reactor of Figure 2 taken on the line 4—4.

In Figure 1, numeral 11 refers to a conventional pebble heating chamber connected to reactor 12 by means of a pebble throat 13. Outlet conduits 14 and 16, containing pebble feeders 17 and 18, respectively, pass pebbles from reactor 12 into pebble chute 19 for gravitation to the bottom of elevator 21, which may be a bucket elevator or other conventional elevating means transferring pebbles to the top of the apparatus. Elevator 21 lifts the pebbles and feeds them into chute 22 from which they gravitate into the top of heater 11. The pebbles are heated in heater 11 by means of hot combustion gas produced from a combustible, gaseous mixture introduced to a burner in the lower section of the heater through line 23. The hot combustion gas passes upwardly in contact with the pebbles in heater 11 imparting heat thereto and rapidly becoming cooled; the cooled combustion gas egressing through stack 24. The hot pebbles passing into reactor 12 through throat 13 are countercurrently contacted in the various sections of the reactor by feed gases introduced through lines 26 and 27. The gaseous feed introduced through line 27 passes upwardly through the center of the reactor and is taken off through lines 28. The feed introduced through line 26 may be taken off through lines 29 and/or lines 28 as is hereinafter set forth. Valved lines 31 serve to introduce a quenching fluid to effluent lines 29. Similar means (not shown) of quenching the effluent in lines 28 is also required. Valves 32 in effluent lines 29 permit the regulation of the proportion of the effluent from reaction chamber 39 taken off through lines 29.

Figure 2 presents a diagrammatic showing of a preferred modification of the reactor of the invention. Reactor 12 has a metal shell 33 and a pair of refractory linings 34 and 36 of progressively inwardly, higher grade, 36 being of a refractory material such as alumina, magnesia, silicon carbide, zirconia or other super refractory which will withstand temperatures upwards of 3200 or 3300° F. Refractory lining 34 may consist of insulcrete or other less expensive insulation. The reactor 12 encloses an upper high temperature reaction chamber 37 and two subjacent reaction chambers 38 and 39. Reaction chamber 38 is formed by the cylindrical section 41 axially positioned with respect to reactor 12 and the upper chamber thereof and supported as hereinafter described. Cylindrical section 41 has an inverted conical bottom 42 which terminates in a pebble outlet conduit 16 thereby providing for gravitation of pebbles downwardly through the upper reaction chamber 37, cylindrical reaction chamber 38, and out through conduit 16 to the elevator equipment as shown in Figure 1. Cylindrical section 41 forms an annular reaction chamber 39 with the outer wall of reactor 12. The lining 36 of the upper reaction chamber 37 has an extension 43 into annular chamber 39, which in combination with the upper end of cylinder 41, provides an annular pebble throat or passageway 44. This structure provides a gas collecting space 46 above the pebble bed in chamber 39 from which reaction products are withdrawn directly through effluent lines 29. A similar gas collecting space 47 is provided in the upper section of the upper reaction chamber 37 by the extension of throat 13 into the reactor a short distance which is a minor proportion of the height of the upper reaction chamber.

Feed distribution rings 48 and 49 having openings therein are connected with feed lines 27 and 26, respectively, for introduction of suitable feed gases to the lower reaction chamber. The central cylinder 41 forming the inner reaction chamber 38 may be supported by any suitable means such as a series of refractory blocks 51 resting on the refractories of conical bottom 52 of reactor 12. These blocks are spaced apart from each other at sufficient distances to provide pebble passageways therebetween, thereby permitting easy flow of pebbles through annular reaction chamber 39 to pebble outlet 14.

Referring to Figure 3, various parts and elements of the apparatus are numbered in accordance with the numbers of the parts shown in Figures 1 and 2 and should be self-explanatory. This modification of the invention shows four effluent lines 28 from the upper reaction chamber and six effluent lines 29 from the annular reaction chamber 39. A greater or lesser number of effluent lines from these chambers may be utilized without materially affecting the process performed in the apparatus, but at least three effluent lines symmetrically disposed should be utilized in each instance.

The elements or parts of Figure 4 are numbered to correspond with the corresponding parts of the apparatus shown in Figures 1, 2, and 3. This figure should be self-explanatory.

In most applications of the invention, it will be desirable to design the reactor so that inner reaction chamber 38 is of smaller horizontal cross sectional area than upper reaction chamber 37. Such an arrangement provides better flow of pebbles from the upper chamber into the subjacent annular chamber than can ordinarily be obtained where the diameter of inner chamber 38 is as large as the diameter of upper chamber 37. However it is feasible to design inner reaction chamber 38 of as large a diameter as upper chamber 37, providing means is included in the design for diverting the flow of pebbles into the surrounding annular reaction zone. This diversion means may comprise a truncated conical section on the upper end of the cylindrical member forming the inner reaction chamber 38. This truncated section should be relatively short so as not to interfere with the flow of pebbles through inner chamber 38. In this type of arrangement the inner cylindrical chamber 38 should extend into upper chamber 37 but should be disposed a short distance below the lower end of the upper chamber so as to provide an annular pebble space between the truncated conical section on the upper end of the cylindrical chamber and the wall section joining the bottom of the upper chamber with the outer wall of annular chamber 39.

The reactor shown in the various figures of the drawing is designed to permit the simultaneous and separate heating and reacting of two similar or dissimilar feeds and separate recovery of the effluents from each reaction. It is particularly advantageous in the conversion or cracking of normally gaseous hydrocarbons to acetylene in the upper chamber by introducing a suitable feed through line 27 and distribution ring 48. At the same time, a similar or dissimilar feed is introduced to the annular reaction chamber 39 through line 26 and distribution ring 49.

In operation according to the invention, pebbles are heated in heater 11 to a temperature in the range of 1850 to 3200° F. and are gravitated through reactor 12 where the pebbles are contacted with hydrocarbon or other convertible gases in the various sections of the reactor. In processes requiring extremely rapid heating of the feed, such as in the cracking of normally gaseous hydrocarbon to produce acetylene, the structure of the reactor shown in Figure 2 provides considerably faster or sharper heating in the acetylene-producing section of the reactor, i.e., the upper reaction chamber 37, than is provided in conventional pebble heater reactors because of the fact that the pebble circulation rate is much greater through the upper reaction chamber 37 than through inner reaction chamber 38, in terms of pounds of pebbles passing through these zones per hour. In this manner a feed such as ethane or propane is heated to incipient cracking with some production of ethylene in reaction chamber 38 and then, as the gases pass upwardly through expanded reaction chamber 37, they are contacted with greater quantities of hotter pebbles so as to sharply increase the amount of heat available for further heating of the gases and endothermic cracking of the hydrocarbon material to acetylene without over-cracking and development of side reactions due to extended contact time. In this manner highly efficient heating and cracking is effected and the temperature of the pebbles egressing through pebble conduit 16 can be reduced to such a range as to permit transfer in ordinary carbon steel or cast iron equipment.

The proportional cross sectional areas or diameters of upper chamber 37 and cylindrical chamber 38 can be selected, in correlation with the height of these chambers, so as to obtain the desired contact time in both of these chambers with a given feed rate. Of course, the amount of heat available from the pebbles in these chambers is dependent upon the temperature of the incoming pebbles in throat 13, the specific heat of the pebbles, and their rate of flow. The secondary feed introduced through line 26 is distributed in annular reaction chamber 39 by means of feed distribution ring 49 and passes upwardly through the gravitating pebble bed which brings the feed to reaction temperature and produces the desired product. When cracking ethane in chambers 37 and 38, it is advantageous to crack propane or butane or other $C_3$ and $C_4$ hydrocarbons in the annular reaction chamber 39. All of the reaction products from reaction chamber 39 may be withdrawn through lines 29 or, under certain operating conditions, it may be desirable to withdraw only a portion of the reaction product through line 29 and by regulation of the pressure differential in the reaction chambers and the effluent lines pass a portion of the effluent through passageway 44 into the upper reaction chamber 37 for further cracking. However, it will generally be more advantageous to withdraw all of the reaction product from chamber 39 through effluent lines 29. An exception to this type of operation will be practiced when different feed gases are introduced through lines 26 and 27 for preheating in chambers 38 and 39 after which they are mixed in the upper reaction chamber and are reacted. The partial oxidation of a gaseous hydrocarbon to form synthesis gas comprising CO and $H_2$ by separately preheating the oxygen-containing gas and the hydrocarbon and reacting them at elevated temperature may be advantageously performed in the apparatus described herein.

An important feature of the invention is the arrangement of the separate lower reaction chambers in reactor 12 with separate pebble outlet conduits, each having a pebble feeder device therein. Pebble feeders 17 and 18 may be operated independently at variable pebble feed rates so as to provide different pebble circulation rates through the two lower chambers in accordance with the heating requirements therein. The pebble circulation rate through upper chamber 37 is, of course, equal to the sum of the feed rates set by the two feeders. The pebble circulation rate through the upper reaction chamber is always greater than that through the lower inner chamber because only a portion of the pebbles leaving the upper chamber enters the inner chamber, the remainder passing through the outer chamber. The relative circulation rates in the upper chamber and in the lower inner chamber may be varied over a wide range by varying the relative speeds or feed rates of the independent pebble feeders serving the two lower chambers. It is generally preferred to operate these feeders so that the above ratio, in terms of pounds of pebbles circulated per hour, is in the range of 3:2 to 5:1. If the two feeders are operated so as to feed pebbles at the same rate, the ratio of the pebble circulation rate in the upper chamber to that in the inner lower chamber will be 2:1. If the feeders are operated so that two-thirds of the pebbles flow through the outer chamber the ratio will be 3:1.

The reactor of the invention is designed and constructed so as to supply the high temperature cracking requirements at the high temperature level required in the production of acetylene. The cracking in the outer annular chamber is at considerably lower temperature than in the upper chamber, but the heat afforded by the pebble bed in this chamber is sufficient to crack relatively large volumes of normally gaseous paraffins to olefins.

The reactor of the invention provides improved pebble and gas flow characteristics over pebble and gas flow in a conventional pebble reactor. It has been found that in a conventional pebble reactor having a single pebble outlet with a single feeder controlling the flow of pebbles through the reactor the pebbles flow considerably faster through the center of the bed around the axis of the reactor than along the wall of the reactor. This results in a hotter core of pebbles at the center of the bed than at the periphery thereof. In addition to this temperature differential which would normally occur with uniform gas flow through the bed, the known non-uniformity of gas flow which actually exists in a conventional reactor aggravates this temperature differential because of the tendency of the gas passing upwardly through the reactor to flow to the outside of the chamber. In other words, smaller volumes of gas contact the hotter pebbles at the core of the bed per unit mass of pebbles than contact the pebbles near the periphery of the bed.

The structure of the reactor shown in Figure 2 permits operation in which the pebbles near the periphery of the upper chamber can be made to flow as rapidly as those near the axis of the chamber thereby more nearly approaching uniformity of pebble flow in this chamber than can possibly be obtained in a chamber of similar shape in which there is only one axially positioned outlet. The structure shown also directs the feed gas to the upper chamber through the center of the bed and toward the effluent lines at the top of the chamber so as to decrease the concentration of gas near the periphery in contrast to flow in the conventional type reactor. In addition to the improved pebble and gas flow in the upper chamber, the structure shown provides improved gas and pebble flow in the annular chamber of the apparatus as compared to flow in a cylindrical chamber. The bed in this chamber has a relatively narrow thickness in comparison to its height and it has been found that this shape of pebble chamber has better pebble and gas flow characteristics than one in which the height of the bed is approximately equal to its thickness or width. Pebble and gas flow characteristics in the inner chamber are not improved over those of a conventional pebble heating chamber but this is not regarded as a disadvantage because of the fact that the feed gas is merely being heated to reaction temperature in the lower three-fourths of the chamber in most instances. It has been found that non-uniform pebble and gas flow in a conventional pebble reactor results in over-cracking of a portion of the hydrocarbon feed and under-cracking of another portion. In such a situation, the over-cracking and under-cracking of portions of the feed reduce the yield of a specific desired product and renders the process less efficient.

In the high temperature cracking of hydrocarbon to produce acetylene it is advantageous to dilute the hydrocarbon feed with an inert gas such as hydrogen, steam, $CO_2$, and/or nitrogen. Hydrogen is particularly advantageous because it is produced in the process and can be separated and recycled to advantage. The reactor of the invention makes it possible to dilute the hydrocarbon feed to the inner chamber without diluting the feed to the outer chamber where it is not so advantageous.

To illustrate the invention, a feed consisting essentially of a mixture of propane and steam is fed in two separate streams at the rate of 57,000 s.c.f./hr. of propane and 11,000 lb./hr. of steam to a pebble heater reactor constructed in the manner illustrated in Figure 2. The following data represent the temperature conditions maintained along with some of the results obtained.

| | Pebble and gas temperatures (° F.) | | |
|---|---|---|---|
| | Upper chamber | Inner chamber | Outer chamber |
| Pebble inlet temperature | 2,700 | 1,900 | 1,900 |
| Pebble outlet temperature | 1,900 | 400 | 400 |
| Feed inlet temperature | 1,400 | 250 | 250 |
| Effluent temperature | 2,400 | 1,400 | 1,400 |

| | Low temp. product | High temp. product |
|---|---|---|
| Dry gas (s.c.f./hr.) | 52,000 | 66,000 |
| Including: | | |
| Acetylene (lb./hr.) | | 440 |
| Ethylene (lb./hr.) | 730 | 230 |
| Hydrogen (s.c.f./hr.) | 11,000 | 39,000 |

In the production of acetylene in accordance with the invention, it is possible to obtain acetylene concentrations in the range of 10 to 15 percent by volume in the effluent from the upper reaction chamber while simultaneously producing a secondary effluent from the outer reaction chamber containing ethylene in concentrations in the range of 15 to 20 percent by volume.

From the foregoing description of the invention it can be seen that the same provides a reactor design having numerous specific advantages over conventional pebble heater reactors as set forth herein. Certain modifications of the invention will become apparent to those skilled in the art and the illustrative details disclosed are not to be construed as imposing unnecessary limitations on the invention.

I claim:

1. A process for the conversion of hydrocarbons involving a substantial amount of cracking comprising heating a compact stream of pebbles to a temperature above a predetermined conversion temperature; gravitating the hot stream of pebbles thru an upper conversion zone and then splitting said stream and passing separate portions thereof thru a pair of separate subjacent conversion zones comprising an inner cylindrical zone and an outer annular zone; introducing separate vaporous hydrocarbon feed streams to the lower section of each of said subjacent conversion zones and passing same upwardly therethru so as to preheat same to cracking temperature and effect at least partial cracking thereof; passing the entire effluent from said cylindrical zone upwardly thru said upper conversion zone so as to continue the cracking therein to produce acetylene; recovering at least a portion of the effluent from said annular zone directly therefrom; and recovering a hydrocarbon effluent containing acetylene from the upper section of said upper conversion zone.

2. The process of claim 1 in which the pebble flow rates thru the separate subjacent conversion zones are proportioned so as to maintain a ratio of mass of pebbles passed thru the upper conversion zone to mass of pebbles passed thru the inner subjacent conversion zone in the range of 3:2 to 5:1.

3. A process for the cracking of hydrocarbons comprising heating a compact stream of pebbles to a temperature at least 150° F. above a predetermined cracking temperature in the range of 1700 to 3000° F.; gravitating the resulting hot stream of pebbles thru an upper cylindrical conversion zone and then splitting same into two separate streams; gravitating one of said separate streams in a cylindrical column thru an inner subjacent zone while passing the other separate stream in an annular column thru a separate outer zone surrounding said inner zone; countercurrently contacting the pebbles in said inner zone with a normally gaseous hydrocarbon feed so as to heat and only partially crack same to other hydrocarbon; countercurrently contacting the pebbles in said outer zone with a separate normally gaseous hydrocarbon feed under cracking conditions which produce ethylene; recovering at least a portion of the effluent containing ethylene from said outer zone directly from the upper section thereof; passing the entire effluent from said inner zone directly thru said upper conversion zone so as to further crack hydrocarbon therein at a temperature in said range and produce acetylene; and recovering an effluent containing acetylene from the upper section of said upper zone.

4. The process of claim 3 in which the feed to said inner zone is an ethane-rich stream and the feed to said outer zone is a propane-rich stream.

5. A process for the cracking of a normally gaseous hydrocarbon which comprises maintaining a gravitating compact bed of hot refractory pebbles in a heat exchange system comprising an upper pebble heating zone and a lower reaction zone connected with said pebble heating zone by a relatively narrow passageway, said reaction zone comprising a single upper zone and a pair of separate, subjacent concentric zones including an inner cylindrical zone of lesser diameter than said upper zone and an outer annular zone; continuously withdrawing cooled pebbles in separate streams from said cylindrical zone and from said annular zone and transferring same to said pebble heating zone; contacting the pebbles in said pebble heating zone with hot combustion gas so as to heat same to a temperature at least 150° F. above a predetermined cracking temperature in the range of 1700 to 3000° F.; countercurrently contacting the pebbles in said annular zone with a normally gaseous hydrocarbon feed so as to crack same to lighter hydrocarbon, including ethylene; recovering an effluent stream containing ethylene directly from the upper section of said annular conversion zone; countercurrently contacting the pebbles in said cylindrical zone with a second normally gaseous hydrocarbon feed so as to heat same at least to incipient cracking; passing the entire effluent from said cylindrical zone directly thru said upper zone so as to continue the cracking therein at a more rapid rate than would occur if all of said pebbles were circulated thru said cylindrical zone so as to produce acetylene and recovering cracked product containing acetylene from said upper zone.

6. The process of claim 5 in which the feed to said cylindrical zone is more refractory than the feed to said annular zone.

7. The process of claim 5 in which an ethane-rich stream is fed to said cylindrical zone and a propane-rich stream is fed to said annular zone.

8. Pebble heater apparatus comprising in combination a refractory lined vessel enclosing an upper reaction chamber having gas outlet means and pebble inlet means in its top section, a first subjacent reaction chamber coaxial with said upper chamber and of lesser cross sectional area having gas inlet means and pebble outlet means in its bottom section, and a second subjacent reaction chamber surrounding said first subjacent reaction chamber and concentric therewith having gas inlet means and pebble outlet means in its bottom section and gas outlet means in its top section for separately removing gas from said second subjacent chamber, said upper chamber being in open communication with each subjacent chamber so as to provide for gravitation of pebbles thru each of said chambers; a pebble delivery conduit extending downwardly from each of said pebble outlet means and from said vessel; and a pebble feeder in each of said conduits arranged for independently controlling the flow of pebbles through each of said subjacent chambers.

9. The apparatus of claim 8 including an effluent line in communication with said gas outlet means in said second subjacent reaction chamber and a gas flow control means therein.

10. Pebble heater apparatus comprising in combination a refractory lined vessel enclosing an upright upper cylindrical reaction chamber having gas outlet means and pebble inlet means in its top section, a subjacent cylindrical reaction chamber coaxial with said upper chamber of lesser diameter having gas inlet means and pebble outlet means in its bottom section, and a subjacent annular reaction chamber surrounding said subjacent cylindrical chamber having gas inlet means and pebble outlet means in its bottom section and gas outlet means in its top section, the aforesaid subjacent reaction chambers being in open communication with the bottom of said upper chamber so as to provide for gravitation of pebbles from the pebble inlet in said upper chamber thru said vessel to the pebble outlets in said subjacent chambers; separate pebble conduits connecting with each of said pebble outlets and extending downwardy outside of said vessel to provide for separate withdrawal from said vessel of the pebbles from each of said subjacent chambers; and a pebble feeder in each conduit for independently regulating flow of pebbles thru each of said subjacent chambers.

11. The apparatus of claim 10 in which the diameter of said annular chamber is at least as great as the diameter of said upper chamber.

12. The apparatus of claim 10 including an effluent line in communication with said gas outlet means in said annular chamber having a gas flow control means therein.

13. Pebble heater apparatus comprising in combination a refractory lined vessel enclosing an upright upper cylindrical reaction chamber having an axially disposed pebble inlet conduit extending into said upper chamber a minor portion of the length of the chamber and a plurality of gas takeoff conduits disposed symmetrically in its top, a subjacent axially disposed cylindrical chamber open on its upper end to said upper chamber having an inverted conical bottom terminating in a pebble outlet and having a gas distributing member in its lower section, and a coaxial subjacent annular chamber having an inverted conical bottom terminating in a pebble outlet and spaced apart from the conical bottom of said subjacent cylindrical chamber so as to provide a pebble passageway therebetween, having a series of gas takeoff conduits symmetrically disposed around its upper section, and having a gas distributing member in its lower section, said annular chamber being of larger diameter than said upper chamber and open at the top to said upper chamber thru an annular passageway between the wall of said cylindrical chamber and an extension of the wall of said upper chamber; a pebble conduit containing a pebble flow control device extending downwardly from each of said pebble outlets to a common pebble conduit below said vessel; and a compact continuous bed of fluent refractory pebbles extending in natural repose from the pebble inlet in said upper chamber thru said chambers to the flow control devices in said pebble conduits and forming gas collecting space in said upper chamber above the pebble bed and a gas collecting space above the pebble bed in said annular chamber, said gas takeoff conduits in both instances opening into their respective gas collecting space.

14. Pebble heater apparatus comprising in combination a refractory lined vessel enclosing an upper reaction chamber having gas outlet means and pebble inlet means in its top section, a first subjacent reaction chamber coaxial with said upper chamber and of lesser cross sectional area having gas inlet means and pebble outlet means in its bottom section, and a second subjacent reaction chamber surrounding said first subjacent reaction chamber and concentric therewith having gas inlet means and pebble outlet means in its bottom section and gas outlet means in its top section, said upper chamber being in open communication with each subjacent chamber so as to provide for gravitation of pebbles thru each of said chambers; a first pebble delivery conduit extending downwardly from the pebble outlet from said first subjacent chamber through the wall of said vessel; and a second pebble delivery conduit extending downwardly from the pebble outlet of said second subjacent chamber outside of said vessel.

15. The process of claim 1 including the steps of separately regulating the flow rate of pebbles from each said subjacent conversion zone so as to control the heat input to same.

16. The process of claim 15 wherein the feed to said outer zone is a butane-rich stream.

17. The process of claim 3 wherein the feed to said inner zone is an ethane-rich hydrocarbon stream and the feed to said outer zone comprises a hydrocarbon of the group consisting of $C_3$ and $C_4$ hydrocarbons.

18. The process of claim 3 wherein a butane-rich stream is fed to said outer zone.

19. The process of claim 3 wherein a propane-rich stream is fed to both subjacent zones.

20. The process of claim 3 wherein a diluent of the group consisting of $H_2$, steam, $CO_2$, and $N_2$ is included in the feed to said inner zone.

References Cited in the file of this patent

UNITED STATES PATENTS

| | | |
|---|---|---|
| 2,432,502 | Bergstrom et al. | Dec. 16, 1947 |
| 2,595,224 | Caldwell | May 6, 1952 |
| 2,692,294 | Boyer | Oct. 19, 1954 |

UNITED STATES PATENT OFFICE
CERTIFICATE OF CORRECTION

Patent No. 2,881,231                                        April 7, 1959

Lee H. Boyer

It is hereby certified that error appears in the printed specification of the above numbered patent requiring correction and that the said Letters Patent should read as corrected below.

Column 10, line 50, list of references cited, for the patent number "2,432,502" read -- 2,432,503 --.

Signed and sealed this 19th day of January 1960.

(SEAL)
Attest:
KARL H. AXLINE

Attesting Officer

ROBERT C. WATSON
Commissioner of Patents